United States Patent [19]

Takasago et al.

[11] Patent Number: 4,730,290
[45] Date of Patent: Mar. 8, 1988

[54] DEFECT DETECTING OPTICAL APPARATUS ENABLING RECORDING IN AN ALTERNATE SECTOR OR TRACK

[75] Inventors: Masahiro Takasago, Odawara; Osami Kushizaki, Hiratsuka, both of Japan

[73] Assignee: Hitachi, Ltd., Tokyo, Japan

[21] Appl. No.: 840,663

[22] Filed: Mar. 18, 1986

[30] Foreign Application Priority Data

Mar. 20, 1985 [JP] Japan ..................... 60-57023

[51] Int. Cl.⁴ .................... G11B 21/08; G11B 27/36
[52] U.S. Cl. .............................. 369/32; 369/46; 369/54; 369/58
[58] Field of Search ............... 369/32, 33, 41, 44–48, 369/50, 53, 54, 58, 116, 38.1; 346/76 L; 360/31, 53, 60

[56] References Cited

U.S. PATENT DOCUMENTS

| | | | |
|---|---|---|---|
| 4,406,000 | 9/1983 | Shoji et al. ............................ | 369/44 |
| 4,546,462 | 10/1985 | Koishi et al. .......................... | 369/53 |
| 4,554,652 | 11/1985 | Maeda et al. .......................... | 369/44 |
| 4,571,716 | 2/1986 | Szerlip ................................... | 369/54 |

FOREIGN PATENT DOCUMENTS 0062464 10/1982 European Pat. Off. ............. 369/44
60-55523 3/1985 Japan .................................. 369/54

Primary Examiner—Raymond F. Cardillo
Assistant Examiner—Steven R. Garland
Attorney, Agent, or Firm—Antonelli, Terry & Wands

[57] ABSTRACT

An optical recording/reproducing apparatus for recording and reproducing information along tracks on an optical disc by irradiating the optical disc with a laser beam comprises a tracking error detecting circuit for detecting the digression of the laser beam from the center line of each track and a level detector for detecting that the output of the tracking error detecting circuit exceeds a predetermined level. An operation for recording information in the optical disc by the laser beam is stopped when the output of the level detector takes a predetermined state indicating that the output of the tracking error detecting circuit exceeds the predetermined level, for a first predetermined time, and a signal indicating the occurrence of off-track is generated when the duration time of the predetermined state in the output of the level detector exceeds a second predetermined time which is longer than the first predetermined time.

10 Claims, 7 Drawing Figures

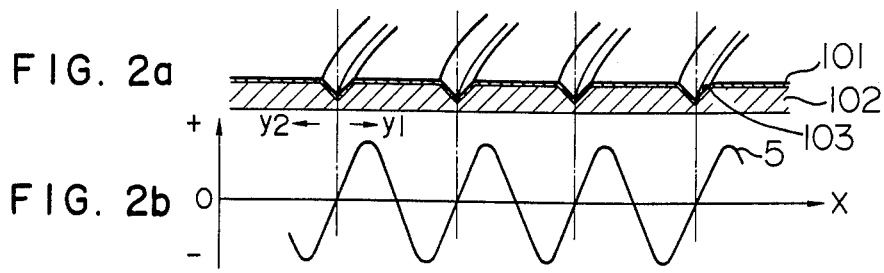
FIG. 2a
FIG. 2b
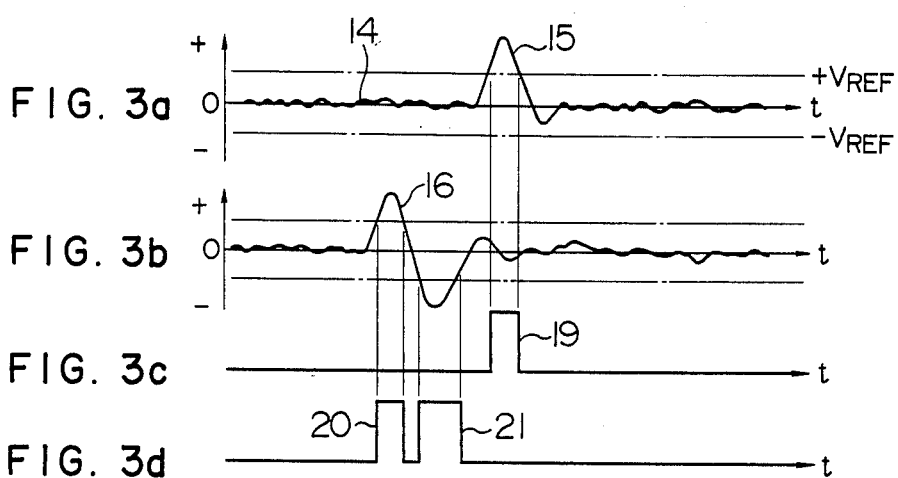
FIG. 3a
FIG. 3b
FIG. 3c
FIG. 3d

DEFECT DETECTING OPTICAL APPARATUS ENABLING RECORDING IN AN ALTERNATE SECTOR OR TRACK

BACKGROUND OF THE INVENTION

The present invention relates to an optical recording-/reproducing apparatus, and more particularly to a control operation at a time the digression of a light beam from a desired track (called "off-track") is caused by the abnormality in an optical disc or the above apparatus.

An optical disc apparatus has been put to practical use in which a recording film on a disc-shaped substrate is irradiated with a light beam to thermally form holes (called "pits") in the recording film, thereby recording data therein. In optical disc apparatuses of this type, concentric grooves or a spiral groove is generally formed on an optical disc as a recording medium to define a multiplicity of tracks. Usually, the tracks are arranged at intervals of about 1.6 $\mu$m in the radial direction of the optical disc. Accordingly, even when the light beam digresses from a desired track only a little in the recording, a large amount of data will be destroyed. Therefore, it is necessary to accurately position the light beam on the track. That is, an optical disc apparatus is required to surely detect the digression of a light beam from a track (namely, to securely detect the off-track) in recording of data. An optical information processor provided with means for detecting the off-track has been disclosed in Maeda et al U.S. Pat. No. 4,554,652 issued Nov. 19, 1985 and owned by the present assignee. In this optical information processor of the Maeda et al patent, when the output of a detector for detecting the digression of the center of a light spot which is formed on an optical disc, from the center line of a track (hereinafter referred to as "tracking error signal") exceeds a predetermined level for more than a predetermined time, in a recording operation for writing data in the optical disc, it is judged that off-track is generated, and consequently the recording operation is stopped. At the same time, a controller is informed of the generation of off-track, and the same recording operation is performed for another sector or another region in the sector with off-track on the basis of a command from the controller. Usually, in an optical disc apparatus for recording digital data, after a data has been recorded in one track or in one sector of the track, a light head is returned back along the track, to check whether the recorded data can be properly read out. When a sector with a data being not normally read out is found, the data is again recorded in a spare sector namely, an alternate sector which is provided on the same track or a different track. Such operation is called "read-after-write operation". In a case where an off-track is detected from the tracking error signal during recording, if the recording operation is immediately stopped as mentioned above, an error in data recording will be detected in the read-after-write operation, and the data in the defective sector will be again written in an alternative sector. The off-track is caused mainly by a defect on the surface of an optical disc or a mechanical shock externally applied to an optical disc apparatus. In a case where the defect on the optical disc is nearly equal in size to a minimum defect capable of causing the off-track, owing to the difference in characteristics among optical disc apparatuses, a light spot follows a track in various manners when the light spot reaches the defect. That is, in an optical disc apparatus, the light spot may pass the defect without digressing from the track, though the off-track is detected at the defect. The same optical disc as used in the above optical disc apparatus can be loaded in another optical disc apparatus. In another optical disc apparatus, however, a light spot may digress from the track at the defect, and it may be impossible to write the same data as spoiled by the defect in an alternate sector and to read out the data from the alternate sector. The above-referenced Maeda et al U.S. patent does not teach a solution to the problem of offtrack due to the difference in characteristics among optical disc apparatuses.

SUMMARY OF THE INVENTION

An object of the present invention is to provide an optical recording/reproducing apparatus capable of normally reading out data which has been recorded in an optical disc, even when the optical disc is set in different optical disc apparatuses.

Another object of the present invention is to provide an optical recording/reproducing apparatus which can normally reproduce data from an optical disc independently of the difference in characteristics among optical disc apparatuses used, and which is applicable to various types of optical discs.

A further object of the present invention is to provide an optical recording/reproducing apparatus in which even when off-track is caused by a defect on an optical disc in recording a data, the generation of off-track is previously detected to stop the recording operation.

Usually, an optical disc apparatus is designed such that, as long as the size of a defect on an optical disc lies within a predetermined specification, off-track never occurs. Further, individual optical discs are strictly inspected after having been fabricated, to prevent an optical disc with a defect not meeting the predetermined specification from being available to a user. However, when dust or the like is attached to an optical disc for some causes, the dust acts as a defect, and may cause off-track. Moreover, it depends upon unevenness of the characteristics of optical disc apparatuses loaded with the optical disc whether off-track occurs or not.

An optical disc apparatus is provided with a circuit for detecting digression of a light spot from a desired track. It is preferable that the digression detecting circuit delivers a digression detection signal (hereinafter referred to as "off-track signal") before the light spot completely digresses from the track. Accordingly, when a large defect capable of causing off-track is present on an optical disc, an off-track signal is produced. Let us consider a case where, upon detection of an off-track signal in a recording operation, the supply of a recording current to a light source is stopped to interrupt the operation. In an optical disc apparatus which scarcely brings about off-track, a data is again recorded in an alternate sector succeeding to the defective sector upon detection of off-track signal and thus, the recording operation can be normally performed. However, when the same optical disc is loaded in another optical disc apparatus which readily brings out off-track, the light spot completely digresses from the track, and thus the data cannot be written in and read out from sectors which follow the defective sector. That is, it is difficult to use the optical disc in different optical disc apparatuses with compatibility.

Off-track is caused not only by the defect on an optical disc but also by external disturbances, such as the mechanical shock applied to an optical disc apparatus. Off-track due to the external disturbances occurs more rapidly, as compared with off-track due to the defect on the optical disc. From consideration of the facts, the following measures are proposed that a time used as a reference for determining off-track, that is, a time during which a tracking error signal exceeds a predetermined level, is set to one of a time in which off-track never takes place and a time in which neighboring data is never destroyed even with occurrence of off-track, and off-track is detected on the basis of the reference time thus set. In response to detection of off-track, a controller judges that abnormality arises in the optical disc apparatus, and data digressively recorded in a track undergoing off-tracking is again recorded in another track. With the measures, the problem that data recorded in an optical disc by an optical disc apparatus cannot be read out by another apparatus will be solved. However, since the reference time for determining off-track is very short, and becomes nearly equal to a time necessary for the light spot to pass a defect on the optical disc, there is a fear that the off-track is detected, notwithstanding the light spot passes the defect without digressing from the track.

To improve the proposed solution, the present invention involves that off-track is detected at two stages. When the duration time of an off-track signal exceeds a first time interval $T_1$, recording of data in only a sector subject to off-track is stopped but a controller is not informed of the occurrence of off-track. Accordingly, in a read-after-write operation, a data to be recorded in the off-track sector is re-recorded in an alternate sector on the same track. When a large defect is present on the optical disc and the duration time of the off-track signal exceeds a second time interval $T_2$, the recording operation is stopped, and the controller is informed of the occurrence of off-track. Upon reception of the off-track information, the controller judges that the track concerned is abnormal, and instructs to re-write the data to be recorded in another track. For example, the time intervals $T_1$ and $T_2$ are determined preferably as follows. Taking into consideration unevenness in characteristics among optical disc apparatuses, the time interval $T_1$ is set shorter than a time necessary to cause off-track due to abnormality in optical disc apparatus, and the second time interval $T_2$ is set shorter than a time necessary to cause off-track due to a defect on an optical disc, provided that $T_2 > T_1$. The unevenness in characteristics among optical disc apparatuses is caused by factors, such as unevenness or variations in band-width of a servo system for driving an optical head, variations in output signal of a detector for detecting reflected light from an optical disc, and variations in the driving force of galvano-mirror. The time intervals $T_1$ and $T_2$ satisfying the above-mentioned requirements are determined based on these factors.

BRIEF DESCRIPTION OF THE DRAWINGS

FIGS. 2a and 2b are a sectional view and a waveform chart for explaining the relation between tracks and a tracking error signal, respectively.

FIGS. 3a to 3d are diagrams showing waveforms of signals which are generated when a light spot follows a track.

DESCRIPTION OF THE PREFERRED EMBODIMENT

Figure 1:
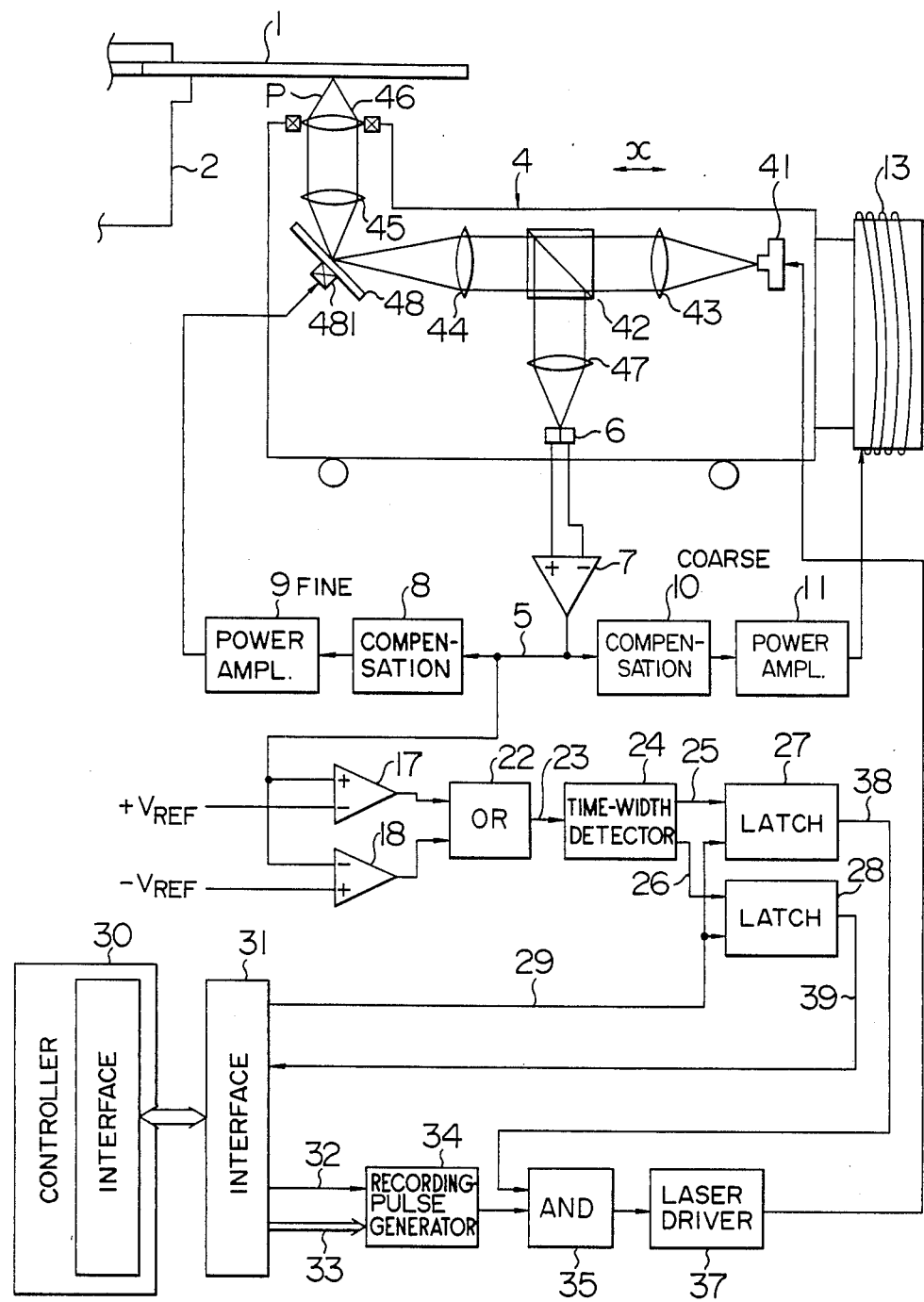
FIG. 1 is a block diagram showing an embodiment of an optical recording/reproducing apparatus according to the present invention.

FIG. 1 shows, in block diagram form, construction of an embodiment of an optical recording/reproducing apparatus according to the present invention. Referring to FIG. 1, a disc-shaped optical medium for recording information therein, namely, an optical disc 1 can be loaded in optical disc apparatuses having the same specification. The optical disc 1 loaded in the optical disc apparatus is rotated by a spindle motor 2. It is to be noted that only the right half of each of the optical disc 1 and the spindle motor 2 is shown in FIG. 1. The optical disc 1 has the following structure. As shown in FIG. 2a, a groove is spirally provided in one surface of a substrate 102, to form groove-shaped tracks 103, and this surface is coated with a recording film 101. One track is defined by one revolution of the groove, and therefore, a multiplicity of tracks 103 are formed on the optical disc 1. Each track is formed by a plurality of sectors, the greater part of which is used as a data recording area, and at least one sector is used as an alternative sector. When a sector is judged to be defective by a read-after-write operation which is performed immediately after data has been recorded in the sector, the data is recorded in an alternative sector.

Referring back to FIG. 1, an optical head part 4 for recording information in the optical disc 1 and for reproducing information from the optical disc 1, includes a semiconductor laser 41 for emitting a light beam, a beam splitter 42, a lens system made up of lenses 43 to 47, and a galvano-mirror 48 for controlling the propagation direction of reflected light. The light beam emitted from the semiconductor laser 41 impinges upon the surface of the optical disc 1 through the beam splitter 42, the lenses 43 to 46 and the galvano-mirror 48, and is focussed to a light spot P having a diameter of about 1.6 $\mu$m. The light beam reflected back from the optical disc 1 travels on the same path as that of the incident light beam in an opposite direction. That is, the reflected light beam passes through the lenses 46 and 45, are reflected from the galvano-mirror 48, and then reaches the beam-splitter 42 through the lens 44. The reflected light beam is separated from the incident light beam by the beam splitter 42. The reflected light beam which has been separated from the incident light beam, passes through the lens 47, and then impinges on a light detector 6 which includes a pair of sub-detectors to detect a tracking error. The optical head part 4 further includes an optical system and a light detector (not shown) for obtaining a focus error signal which is applied to the driving mechanism of the lens 46 to automatically focus the incident light beam on the optical disc 1, and another optical system and another light detector (not shown) for taking out a read-out signal for reproducing information from the reflected light beam. These optical systems and light detectors are omitted in FIG. 1, because the present invention has no direct connection with how to produce or process the focus error signal and the read-out signal, but relates only to a tracking servo system. The manner of generating these signals is disclosed in, for example, U.S. Pat. Nos. 4,293,944 and 4,357,696.

The light detector 6 delivers a pair of output signals. For example, the level of one of the output signals is increased when the center of the light spot P digresses from the center line of the track 103 of FIG. 2a in a $y_1$-direction, and the level of the other output signal is increased when the center of the light spot P digresses in a $y_2$-direction. The output signals from the light detector 6 are applied to a differential amplifier 7, and a tracking error signal corresponding to the difference between the pair of output signals from the light detector 6 is delivered from the differential amplifier 7. Accordingly, the level of the track error signal 5 varies with the digression of the center of the light spot P from the center line of the track 103.

A relation between the tracks 103 of the optical disc 1 and the track error signal 5 is shown in FIGS. 2a and 2b. FIG. 2a shows the section of a few tracks of the optical disc 1, and FIG. 2b shows the waveform of the tracking error signal 5. As shown in FIG. 2b, the tracking error signal 5 has a substantially sinusoidal waveform, and takes zero level at positions corresponding to respective center lines of the tracks 103.

Referring back to FIG. 1, a tracking servo system will be explained below. The tracking error signal 5 from the differential amplifier 7 is applied to a compensation circuit 8 for stabilizing a tracking servo system, another compensation circuit 10 which will be explained later, and level comparators 17 and 18. A compensating signal for compensating the tracking error signal 5 is sent from the compensation circuit 8 to a power amplifer 9, which amplifies the compensating signal. The output of the power amplifier 9 is applied to a driving unit 481 for driving the galvano-mirror 48. Thus, the galvano-mirror 48 is driven so that the center of the light spot P follows the center line of a track. Such a servo system servo as a fine servo system.

A coarse servo system is made up of the compensation circuit 10, a power amplifier 11 and a voice-coil motor 13. The compensation circuit 10 and the power amplifier 11 are equal in function to the compensation circuit 8 and the power amplifier 9, respectively. The output of the power amplifier 11 is applied to the voice-coil motor 13, which moves the optical head unit 4 in an x-direction, that is, in a radial direction of the optical disc 1.

Next, explanation will be made of a control operation in case of off-track which is the characteristic feature of the present invention.

The tracking error signal 5 is applied to the comparators 17 and 18, to be compared with reference voltages $+V_{REF}$ and $-V_{REF}$. When the light spot is exactly placed on the track 103, the tracking error signal 5 is zero volt, as shown in a signal portion 14 of FIG. 3a. When a defect is present on the track, the tracking error signal 5 has a large amplitude, as a signal portion 15 of FIG. 3a. That portion of the tracking error signal 15 which departs from a range defined by the reference voltages $+V_{REF}$ and $-V_{REF}$, is detected by the comparators 17 and 18, and is converted into a pulse having a level "1". In the above case, a pulse 19 is delivered from the comparator 17, as shown in FIG. 3c. In the normal state, the outputs of the comparators 17 and 18 take a level "0". When the light spot actually digresses from the track, the tracking error signal departs from the above range as a signal portion 16 of FIG. 3b, and pulses 20 and 21 of FIG. 3d are delivered from the comparators 17 and 18, respectively. The outputs of the comparators 17 and 18 are ORed by an OR gate 22. Thus, a logical sum signal 23 is applied to a time-width detecting circuit 24, to check the duration time of level "1". That is, when the circuit 24 detects that the duration time of level "1" in the logical sum signal 23 exceeds a predetermined time $T_1$, the track digression signal 25 is sent from the time width detecting circuit 24 to a latch circuit 27, to be latched. An output signal 38 from the latch circuit 27 is sent to an AND gate 35. Further, when the duration time of level "1" in the signal 23 exceeds another predetermined time $T_2$ (where $T_2 > T_1$), the off-track signal 26 is sent from the time width detecting circuit 24 to another latch circuit 28, to be latched. An output signal 39 from the latch circuit 28 is sent to a controller 30 through an interface circuit 31. The latch circuits 27 and 28 are reset by a reset signal 29 from the interface circuit 31.

The controller 30 controls the information recording into the optical disc 1 and the information reproducing from the optical disc 1. In more detail, a write gate signal 32 (that is, a recording control signal) and a recording data signal 33 which is to be recorded in the optical disc 1, are both sent from the controller 30 to a recording-pulse generating circuit 34 through the interface circuit 31. The pulse generating circuit 34 produces a pulse signal having a predetermined pulse width, from the recording data signal 33 in accordance with the write gate signal 32. The output of the recording-pulse generating circuit 34 is applied to the AND gate 35. The AND gate 35 is controlled by the output signal 38 of the latch circuit 27, that is, the track digression signal, and thus the pulse signal produced from the recording data signal 33 is sent from the AND gate 35 to a laser driving circuit 37 when the track digression signal is not applied to the AND gate 35. The laser driving circuit 37 drives the semiconductor laser 41 in accordance with the pulse signal having passed through the AND gate 35. Thus, the light beam which is emitted from the semiconductor laser 41, thermally forms holes or pits in the recording film 101 provided on the tracks 103 of the optical disc 1. A laser driving circuit for reproducing data is omitted in FIG. 1 for simplicity's sake.

Next, the control operation is case of off-tracking will be explained below in more detail., When the track digression signal 25 is delivered from the time-width detecting circuit 24, the AND gate 35 is off and the pulse signal from the recording-pulse generating circuit 34 is not applied to the laser driving circuit 37. Accordingly, the recording of data in the optical disc 1 is stopped. The stoppage of the data recording continues till the reset signal 29 is supplied from the controller 30 to the latch circuit 27 through the interface circuit 31.

An optical disc in which each track is divided into 64 tracks, and 62 sectors and 2 sectors are used as a normal area for recording data and an alternative area, respectively, has been put to practical use. In this optical disc, the recording of data in the normal area and the alternate area is performed for individual sectors. Accordingly, it is preferred to send out the reset signal 29 from the controller 30 each time data has been recorded in one sector.

When the output signal 39 of the latch circuit 28 corresponding to the off-track signal 26 is sent to the controller 30 through the interface circuit 31, the controller 30 judges that abnormality occurs in the optical disc 1, and informs a host apparatus, such as a CPU (not shown) of the abnormality in the optical disc 1. In response to the above information, the host apparatus instructs the controller 30 to record the same data as just before recorded in a track, in another track. In a case where the signal 23 from the OR gate 22 takes the level "1" for a time which is longer than the time $T_1$ and shorter than the time $T_2$, the recording of data in the optical disc 1 is stopped, but the controller 30 is not informed of the occurrence of off-track.

As described above, according to the present embodiment, even when an off-track is caused by a defect on an optical disc or abnormality or unevenness of the characteristics in an optical disc apparatus, the off-track is detected, and the recording of data in the optical disc is stopped. Thus, erroneous recording is prevented.

Further, the time $T_1$ and the time $T_2$ are determined considering the difference or unevenness in characteristics among optical disc apparatuses. Accordingly even when the optical disc is loaded in any one of the optical disc apparatuses, the track digression signal for interrupting the recording data in the optical disc, can be detected, and the controller is informed of abnormality corresponding to the off-track signal.

While the embodiment, in which each track includes at least one alternate sector, has been explained, by way of example, the present invention is not limited to such a case, but it is applicable to another modification in which an alternative sector is provided for a plurality of tracks. In this case, when the off-track is caused by an defect on the optical disc or the abnormality in the optical disc apparatus, like processings described above can be performed.

What is claimed is:

1. A recording control system for an optical recording/reproducing apparatus for recording/reproducing information on a disc-shaped recording medium for recording information therein, said recording medium defining a plurality of tracks, each track being divided into a plurality of sectors for recording information, comprising:
    a light source for emitting a light beam, at least to record information in said recording medium by said light beam;
    optical means for causing the light beam from said light source to be projected upon said tracks of said recording medium and for directing the light beam reflected from said recording medium;
    detection means coupled with said optical means for detecting the light beam which has been reflected from said recording medium and directed by said optical means;
    circuit means for calculating an amount of digression of the light beam from a desired track for one of a recording and a reproducing operation being performed on the basis of an output of said detection means and for delivering a tracking error signal corresponding to the amount of digression;
    comparator means for comparing said tracking error signal with a predetermined level;
    first control means responsive to said comparator means for preventing projection of a recording light beam from said light source upon said recording medium so as to interrupt a recording operation when the duration time of a predetermined state in an output signal of said comparator means exceeds a first predetermined time shorter than a time necessary for off-track of said light beam; and
    second control means responsive to said comparator means for preventing projection of a recording light beam from said light source upon said recording medium to interrupt a recording operation and for informing a controller of said apparatus of occurrence of off-track when the duration time of a predetermined state in an output signal of said comparator means exceeds a second predetermined time longer than said first predetermined time and sufficient to cause off-track;
    wherein said apparatus in response to said recording control system enables information, in which the recording operation thereof is interrupted by said first control means, to be recorded on another sector of the same track, and said apparatus enables the information, in which the recording operation thereof is interrupted by said second control means, to be recorded on another track determined by the controller of said apparatus.

2. A recording control system according to claim 1, further comprising means for setting said first predetermined time and said second predetermined time on the basis of characteristics of a plurality of optical recording/reproducing apparatuses in which said disc-shaped recording medium can be loaded.

3. A recording control system according to claim 2, wherein said setting means sets said second predetermined time for a duratin time in which a light beam digression is caused due to a defect on said recording medium.

4. A recording control system according to claim 1, further comprising means for resetting an interruption state of recording by light beam projection upon the according medium for each sector.

5. An optical recording/reproducing apparatus comprising:
    a disc-shaped recording medium for recording information therein, said recording medium having a plurality of tracks formed thereon, each of said tracks being divided into a plurality of sectors for recording information;
    a laser for emitting a light beam;
    laser driving means for controlling irradiation of the light beam from said laser to said recording medium in accordance with information to be recorded;
    optical means for passing the light beam emitted from said laser to a track on said recording medium, and for directing the light beam reflected from said recording medium;
    detection means for detecting the light beam reflected from said recording medium and directed through said optical means;
    circuit means for providing a signal representative of an amount of digression of the light beam from a desired track for one of a recording operation and a reproducing operation being performed on the basis of an output signal from said detection means;
    servo means for positioning the light beam on the center line of said desired track, in response to an output signal from said circuit means;
    comparator means for comparing the output signal from said circuit means with a predetermined level, and for delivering an output signal from said circuit means is greater than the predetermined level;
    first control means responsive to said comparator means for providing an output signal when the duration time of a predetermined state in an output signal of said comparator means exceeds a first predetermined time shorter than a time necessary for off-track of the light beam;
    second control means responsive to said comparator means for providing an output signal when the duration time of a predetermined state in an output signal of said comparator means exceeds a second predetermined time longer than said first predetermined time and sufficient to cause off-track;

gate means responsive to the output signal from said first control means for inhibiting the application of a signal corresponding to information to be recorded in said recording medium to said laser driving means; and controller means responsive to the first control means for enabling information which has been inhibited from being recorded when said first control means provides the output signal, to be recorded on another sector of the same track, and said controller means responsive to the second control means for enabling recording of the information on another track in response to the output signal from said second control means.

6. An optical recording/reproducing apparatus according to claim 5, wherein said controller means provides a signal for resetting the output signals of said first and second control means each time a recording operation has been performed for one sector on said recording medium.

7. A method of optically recording information comprising the steps of:

passing a light beam to a desired one of a plurality of tracks formed on a disc-shaped recording medium, each of said tracks being divided into a plurality of sectors for recording information;

detecting light reflected from said recording medium;

generating a tracking error signal indicating an amount of digression of the light beam from a track where information is recorded and reproduced on the basis of the result of light detection;

comparing the tracking error signal with a predetermined level;

preventing projection of a recording light beam onto the recording medium so as to interrupt a recording operation when a time during which the level of the tracking error signal exceeds the predetermined level exceeds a first predetermined time shorter than a time necessary for off-track of the light beam;

preventing projection of a recording light beam onto the recording medium to interrupt a recording operation when a time during which the level of the tracking error signal exceeds the predetermined level exceeds a second predetermined time longer than the first predetermined time and sufficient to cause off-track;

enabling information, the recording of which has been interrupted when the first predetermined time is exceeded, to be recorded on another sector of the same track; and enabling information, the recording of which has been interrupted when the second predetermined time is exceeded, to be recorded on another track of the recording medium.

8. A method according to claim 7, further comprising the step of determining the first predetermined time and a second predetermined time on the basis of averaging characteristics of each of a plurality of optical recording/reproducing apparatuses in which the disc-shaped recording medium can be loaded.

9. A method according to claim 8, further comprising the step of setting the second predetermined time to a duration time in which a beam digression is caused due to a defect on the recording medium.

10. A method according to claim 7, further comprising the step of resetting the prevention of projection of the recording light beam for each sector.

* * * * *